Oct. 25, 1949.   R. L. McILVAINE   2,485,981
METHOD OF AND DEVICE FOR TESTING FOUNDRY SAND
Filed Sept. 30, 1944
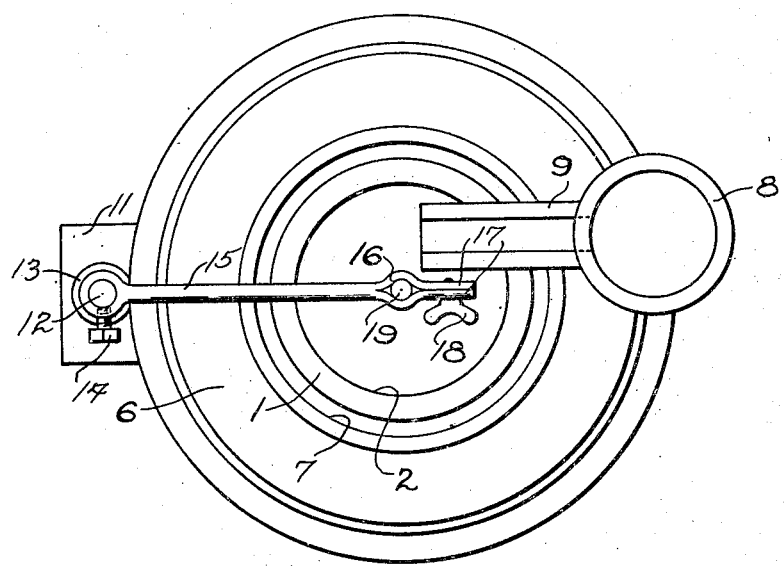
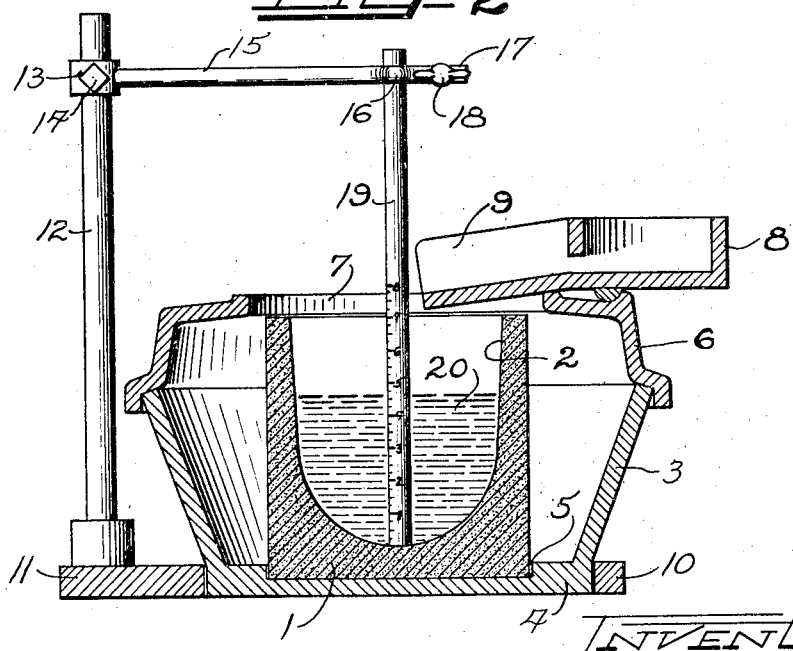
INVENTOR
Robert Louis McIlvaine Patented Oct. 25, 1949

2,485,981

UNITED STATES PATENT OFFICE 2,485,981

METHOD OF AND DEVICE FOR TESTING FOUNDRY SAND

Robert Louis McIlvaine, Glencoe, Ill., assignor to Herbert S. Simpson, Evanston, Ill.

Application September 30, 1944, Serial No. 556,522

13 Claims. (Cl. 73—15.6)

In the preparation and conditioning of foundry sand and the like it is desirable to so mix, mull, bond and treat the sand to impart thereto very definite and desirable molding characteristics. It has, however, been evident that the desired qualities which a satisfactory molding sand or the like should contain, are not measurable collectively by standard tests such as the American Foundry Associations Tests. It has therefore become desirable to provide a simple and effective test method adapted to be practiced by means of an improved device, whereby the qualities of green molding sand and the like may be collectively tested in the device by the use of a test form of the material, to bring out by means of a single result a combination of the requisite qualities such as the tensil and transverse strengths, the flowability, the ramability, the green strength and deformation, and the toughness of the sand or material of which the test form or mold is constructed.

The present invention therefore relates to an apparatus for and a method of more efficiently testing foundry sand and the like by subjecting specimen forms to molten metal check tests, to determine whether the combination of the bond, permeability and strength characteristics add up to the proper moldability desired.

It is an object of this invention to provide an improved method of an apparatus whereby test blocks or forms, constructed of materials to be tested, are subjected to tests which will approximate the actual conditions to which the materials will be subjected in a foundry mold.

It is also an object of this invention to provide an improved method of and apparatus for subjecting test specimen forms of foundry sand or the like to hot lead tests, each of which, by a single result, will indicate whether the combined qualities of the material being tested add up to a desired moldability.

It is a further object of this invention to provide a test apparatus for subjecting formed specimens of foundry sand or the like to actual conditions such as encountered in a foundry mold to determine by a single comparative result the qualities of the material being tested.

Another object of the invention is to provide a simple and effective type of test apparatus whereby a test form, constructed of a material to be tested, is adapted to be subjected to a hot metal test resulting in the collapse of the form to determine the measure of moldability of the material being tested.

It is furthermore an object of this invention to provide an improved method of making a check test of prepared foundry sand or the like by subjecting a recessed test form of the material to a hot metal treatment whereby a collapse of the form by a quantity of the hot metal is measurable by gauge means to determine the measure of moldability of the sand or material being tested.

It is an important object of this invention to provide an improved method of and apparatus for making a check test of conditioned foundry sand or similar material, which test is simple, economical and effective, whereby recessed test forms of the material are gradually filled with a hot metal, to a point of collapse of the form, to determine, by a single result readable on a gauge medium, the measure of moldability of the material.

Other and further important objects of this invention will be apparent from the disclosures in the specification and the accompanying drawing.

In the drawing:

Figure 1 is a top plan view of a material testing apparatus embodying the principles of this invention and adaptable for practicing the method of testing the moldability of a material by means of a hot metal test; and Figure 2 is a vertical sectional view of the apparatus, with parts shown in elevation and showing a material test form in position for receiving a gauge and a quantity of the test metal.

As shown in the drawing:

It is believed that the novel method of this invention, may be readily understood from the following description of the apparatus for practicing the same.

In the conditioning of foundry sand and the like for use in the construction of foundry molds, it is desirable to impart desirable molding characteristics to the sand. These qualities of green molding sand, however, are not conveniently measurable by standard tests which usually require a separate test for each of the qualities investigated. The qualities of green molding sand which are desirable, are usually a combination of qualities such as the tensil strength, the transverse strength, flowability, ramability, green strength, green deformation and toughness. It is therefore desirable to provide a single test which will combine all or a combination of the desired qualities in a single result.

This invention therefore relates to a method of testing foundry sand and the like, said method approximating the conditions which actually are present when a foundry mold is filled.

The test to be performed is not intended as a routine control test but is rather a check or comparison test which will indicate, by a single result, whether the combination of the various desired qualities such as the bond, permeability and strength tests, will add up to a desired moldability.

The improved method or process for testing foundry sand or the like which has been mixed, mulled and conditioned for use, is adapted to be practiced more specifically by means of a machine or appartus in which recessed test pieces or forms, constructed of the material to be tested, are adapted to be subjected to a liquid metal test, approximating actual foundry mold conditions, to determine whether the material being tested contains a combination of the qualities which will add up to the proper moldability desired.

A foundry sand or similar molable material, which is to be tested for moldability, has samples thereof formed into recessed cylindrical test pieces of forms, one of which is indicated by the reference numeral 1. A sample of the foundry sand to be tested is deposited in a standard type of American Foundry Association sand test rammer, with which a specially shaped slug is used. The slug is rammed into the test material to compress and shape the material into a test piece or form 1 having a depression or recess 2, of a predetermined shape, formed in the test piece to form a standard uniform test piece or form as illustrated in the drawing.

The test piece or form 1 is then placed in a testing device or apparatus comprising a test housing consisting of a base section or bowl 3 having a bottom 4 which is provided with a circular recess 5 for receiving the closed bottom of the test form 1 properly centered therein for testing. Removably seated upon the upper end of the test housing base section 3 is a cover 6 having an opening 7 in the top thereof to permit access to be had to the recess 2 within the test form.

Supported on the cover 6 is a hot molten metal receiving basin 8 formed with a pouring spout or trough 9 which has the discharge end thereof positioned to project over the cover opening 7 to permit hot molten lead or other hot molten testing metal to be poured into the recess 2 of the test form 1. The height to which the molten lead or testing metal rises in the test form, before the same collapses, will give a single comparative reading or result to determine the moldability of the sand or material being tested by comparing the test result with a previously determined tested result adding up to a proper moldability.

For the purpose of measuring the depth of the molten metal in a test piece or form 1 constructed of material which is being tested, a measuring mechanism is provided for coaction with the test piece and with the test housing unit. The measuring device comprises a base ring 10 in which the base section 3 of the test housing is adapted to be engaged. Integrally formed radially on the base ring 10 is an extension piece 11 on which an upright or post 12 is rigidly secured. The post 12 extends upwardly above the top of the test housing and has slidably engaged thereon a collar 13 provided with a set screw 14 for holding the collar in a set position of adjustment on the post 12. Extending from the collar 13 is a bracket arm 15 which projects over the cover 6 and over the test form within the test housing and has the end thereof split to form a clamping eye 16 having extension fingers 17 adapted to be drawn together by means of a clamping screw 18.

For the purpose of testing the height of the molten metal within a test form 1 a separate test rod 19 is required for each test form which is tested. The test rod 19 may be a carbon rod or if desired a copper rod may be used. The test rod 19 is provided with a measuring scale the graduations of which may be in inches, centimeters or any other convenient unit of measure, whereby the depth of molten metal deposited into a test form 1 may be conveniently read to provide a single comparative reading to indicate the moldability of the sand being tested by giving a combined result of the various qualities of the sand being tested, thereby obviating the necessity of making a series of different standard foundry tests for individually determining the various qualities of a material. The test rod 19 is constructed of carbon, copper or any other suitable material so that when the molten testing metal is poured into a test form until the test piece collapses, the molten metal will adhere to the graduated end of the test rod 19 to give a desired single test reading. The molten test metal is indicated by the reference numeral 20. The molten metal used in making a specimen test, may be a standard lead of uniform analysis, such as type metal, which may be melted in a standard electrically heated plumber's lead molding furnace provided with a temperature regulator.

The test is not intended as a routine control test, but rather as a check or comparison test which will show by means of a single result, whether the combination of the various bond, permeability and strength tests of a specimen added up to the proper or desired moldability by comparing a test reading with an earlier satisfactory moldability reading of a material which has proven after practical use that it embodied requisite qualities adding up to proper moldability.

It will thus be seen that the testing device of this invention is adapted to provide a means whereby tests of foundry sand and similar material may be quickly and conveniently made to provide a check or comparison test giving a single result indicating the measure of moldability of the specimen by merely permitting molten lead to flow from the trough 9 of the basin 8 into the recess 2 of a test form 1 in the confined area of the test housing until the weight and action of the molten metal causes collapse of the test form. A resultant reading is obtained on the test rod 19 which will indicate the height to which the molten lead rose at the time of collapse of the test form. The test reading is then checked to see how it compares with that of an earlier reading of a test of similar material which through practical use has indicated that it contained the requisite qualities for proper moldability. The check test reading would thus indicate that the material of which the test form was constructed did or did not measure up to a proper moldability. The resultant test reading of a specimen of material would thus give a single check test reading from which it could be determined whether the tested material combined the various qualities desired, such as sufficient tensile and transverse strength, flowability, ramability, green strength and deformation and toughness, which qualities are usually individually measured by a separate standard foundry test instead of by the single combination test, herein set forth and adapted to be practiced by means of the testing apparatus illustrated and described.

It will, of course, be understood that various details of construction and steps in the method may be varied without departing from the principles of this invention, and it is, therefore, not the purpose to limit the patent granted hereon otherwise than necessitated by the scope of the appended claims.

I claim as my invention:

1. A testing mechanism for foundry sand and the like, said mechanism comprising a base member having an opening therein, a bowl engaged in said opening having a centering recess therein for receiving and centering a recessed test form constructed of a material to be tested, a cover for said bowl having an entrance opening therein positioned above the form, a molten metal pouring means supported on the cover for delivering molten metal through the cover opening into the form, a support on the base member, a clamping arm adjustably supported thereon, and a calibrated test member removably clamped in said clamping arm and projecting through said cover opening into the form to have indicated thereon the height to which the molten metal rises in the form at the time of collapse thereof to indicate the measure of moldability of the material of which the form is constructed.

2. A testing mechanism for foundry sand and the like, said mechanism comprising a test housing formed to receive a recessed test form constructed of a material to be tested, means for pouring molten metal into the form, a clamping device, and a calibrated test member carried by the clamping device and projecting into the test housing and into the form to have indicated thereon the height to which the molten metal rises in the form to cause collapse thereof to indicate the measure of moldability of the material being tested.

3. A testing mechanism for foundry sand and the like, said mechanism comprising a housing having an opening therein and formed to have centered therein a recessed test form constructed of a material to be tested, means for pouring molten metal through the housing opening and into the recessed form until the form collapses under the weight and action of the molten metal, and a calibrated test member projecting into the housing and into the form to register the height to which the molten metal rises in the form at the time of collapse thereof.

4. A moldability test mechanism for foundry sand and the like, said mechanism comprising a test housing having an opening therein and formed with a centering recess for receiving a recessed test form constructed of the material to be tested and seated in the centering recess, a testing liquid, means for pouring the liquid through the housing opening and into the recessed test form up to a point of collapse of the test form due to the weight and action of the liquid on the material being tested, and means removably insertable into the housing and into the test form to record the height to which the liquid rises in the test form at the time of collapse to indicate by a single reading a comparable measure of moldability of the material being tested.

5. A testing mechanism for foundry sand and the like, said mechanism including a sectional housing for receiving a test form centered therein and constructed of a material to be tested, means for receiving and centering the test housing, a metal testing liquid, a trough device supported on the housing for pouring the liquid into the test form within the housing up to a point of collapse of the test form, a clamping device supported on said means, and a calibrated test member releasably carried by the clamping device to project into the recessed test form within the housing to register the height to which the liquid rises in the test form at the time of collapse thereof.

6. A foundry material test method comprising forming a sample of material into a recessed test form of a predetermined standard size, then subjecting the form to gradually increasing pressure by pouring liquid metal into the form until a point of collapse is reached and measuring the height of liquid in the form when collapse occurs.

7. A foundry mold material testing method consisting of compressing and forming a sample of the material into a test form, then subjecting of the test form from the interior thereof to gradually increasing liquid metal pressure produced only by the weight of the liquid metal until a point of collapse of the test form is reached and measuring the height of liquid in the form when collapse occurs.

8. The method of making a moldability test of foundry sand or the like, said method comprising compressing and forming a sample of the material into a recessed test form, and then gradually pouring molten metal into the test form up to a point of collapse thereof due to the weight and action of the molten metal, and finally measuring the depth of the molten metal in the test form at the time of collapse thereof to obtain a check test result for comparison with an established moldability record.

9. The method of testing prepared foundry sand and the like, comprising ramming and shaping a sample of the material into a recessed test form of predetermined size, then gradually pouring molten lead into the test form while the form is positioned in a confined area until the collapse of the test form occurs, measuring the height to which the molten metal rises in the test mold at the time of collapse thereof, and then comparing the measured result with a standard reading to determine the measure of moldability of the material being tested.

10. The method of determining the measure of moldability of mixed, mulled and bonded foundry sand and the like, said method consisting of subjecting a recessed test form of the material in a confined area to the action of molten lead to a point of collapse of the test form and measuring the height of molten lead in the test form when collapse occurs.

11. The method of determining the measure of moldability of foundry sand and the like, said method consisting of subjecting a recessed test form of the material in a confined area to the action of molten lead to a point of collapse of the test form, measuring the depth of the molten lead within the test form at the time of collapse thereof to produce a single check result, and then comparing the check result with a standard test result to determine by comparison whether the combined qualities of the material of which the test form is constructed add up to the moldability of the proven material.

12. The method of check testing foundry sand and the like to determine the measure of moldability of the material, said method consisting of subjecting a standard recessed test form of the material to the action of a hot molten metal up to the point of collapse of the form, measuring the amount of hot molten metal required to effect the collapse, and then comparing the result with the amount of molten metal required to collapse a standard form constructed of a similar material which has satisfactorily been tested out and found to include a combination of the proper bond, permeability and strength qualities adding up to the moldability desired.

13. The method of check testing conditioned foundry sand and the like to determine by a single result whether the combination of the various bonds, permeability and strength qualities add up to a proper moldability, said method comprising subjecting a standard recessed test form of the material in an enclosed area to the action of a gradually increasing quantity of hot molten lead up to the point of collapse of the test form, measuring the amount of hot molten lead required to affect the test form collapse, and finally comparing the result with a previous satisfactory test result of similar material to determine whether the combined qualities of the material of the test form add up to a proper moldability.

ROBERT LOUIS McILVAINE.

REFERENCES CITED

The following references are of record in the file of this patent:

UNITED STATES PATENTS

| Number | Name | Date |
|---|---|---|
| 2,048,027 | Preston | July 21, 1936 |
| 2,253,992 | Verduzco | Aug. 26, 1941 |